(12) United States Patent
Breach et al.

(10) Patent No.: US 8,355,481 B2
(45) Date of Patent: Jan. 15, 2013

(54) PRESSURE VESSEL SLIDING SUPPORT UNIT AND SYSTEM USING THE SLIDING SUPPORT UNIT

(75) Inventors: Michael R. Breach, Leland, NC (US); David J. Keck, Wilmington, NC (US); Gerald A. Deaver, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 328 days.

(21) Appl. No.: 12/541,493

(22) Filed: Aug. 14, 2009

(65) Prior Publication Data

US 2011/0038450 A1    Feb. 17, 2011

(51) Int. Cl.
| | |
|---|---|
| F28D 7/00 | (2006.01) |
| F28F 9/00 | (2006.01) |
| F16M 13/00 | (2006.01) |
| A47G 23/02 | (2006.01) |
| A47G 29/087 | (2006.01) |
| A47F 5/00 | (2006.01) |
| E04B 1/32 | (2006.01) |
| E04B 1/38 | (2006.01) |
| E04G 11/04 | (2006.01) |
| E04C 5/00 | (2006.01) |

(52) U.S. Cl. ........ 376/461; 376/463; 376/362; 376/264; 376/268; 376/269; 376/270; 165/162; 165/67; 248/630; 248/154; 211/86.01; 211/119.005; 52/246; 52/247; 52/698

(58) Field of Classification Search .................. 376/461, 376/463, 362, 264, 268, 269, 270; 165/162, 165/67; 211/86.01, 119.005; 248/630, 154; 52/246, 247, 698
See application file for complete search history.

(56) References Cited

U.S. PATENT DOCUMENTS

| | | | |
|---|---|---|---|
| 3,583,429 A | | 6/1971 | Demarchals |
| 4,115,194 A | * | 9/1978 | Butti .............................. 376/461 |
| 4,940,025 A | | 7/1990 | Ott et al. |
| 5,379,331 A | | 1/1995 | Brouttelande |
| 2007/0051493 A1 | * | 3/2007 | Braic et al. ...................... 165/67 |
| 2007/0228045 A1 | | 10/2007 | Goldbach et al. |

FOREIGN PATENT DOCUMENTS

| | | |
|---|---|---|
| GB | 1 396 962 A | 6/1975 |
| GB | 1 517 849 A | 7/1978 |
| JP | 62085891 A   * | 4/1987 |

* cited by examiner

*Primary Examiner* — Erin M Leach
(74) *Attorney, Agent, or Firm* — Harness, Dickey & Pierce, P.L.C.

(57) ABSTRACT

Provided is a sliding support and a system using the sliding support unit. The sliding support unit may include a fulcrum capture configured to attach to a support flange, a fulcrum support configured to attach to the fulcrum capture, and a baseplate block configured to support the fulcrum support. The system using the sliding support unit may include a pressure vessel, a pedestal bracket, and a plurality of sliding support units.

16 Claims, 10 Drawing Sheets

PRESSURE VESSEL SLIDING SUPPORT UNIT AND SYSTEM USING THE SLIDING SUPPORT UNIT

GOVERNMENT SUPPORT

This invention was made with Government support under contract number DE-FC07-071D14778, awarded by the U.S. Department of Energy. The Government has certain rights in the invention.

BACKGROUND

1. Field

Example embodiments relate to a sliding support unit and a system using the sliding support unit.

2. Description of the Related Art

Figure 1:
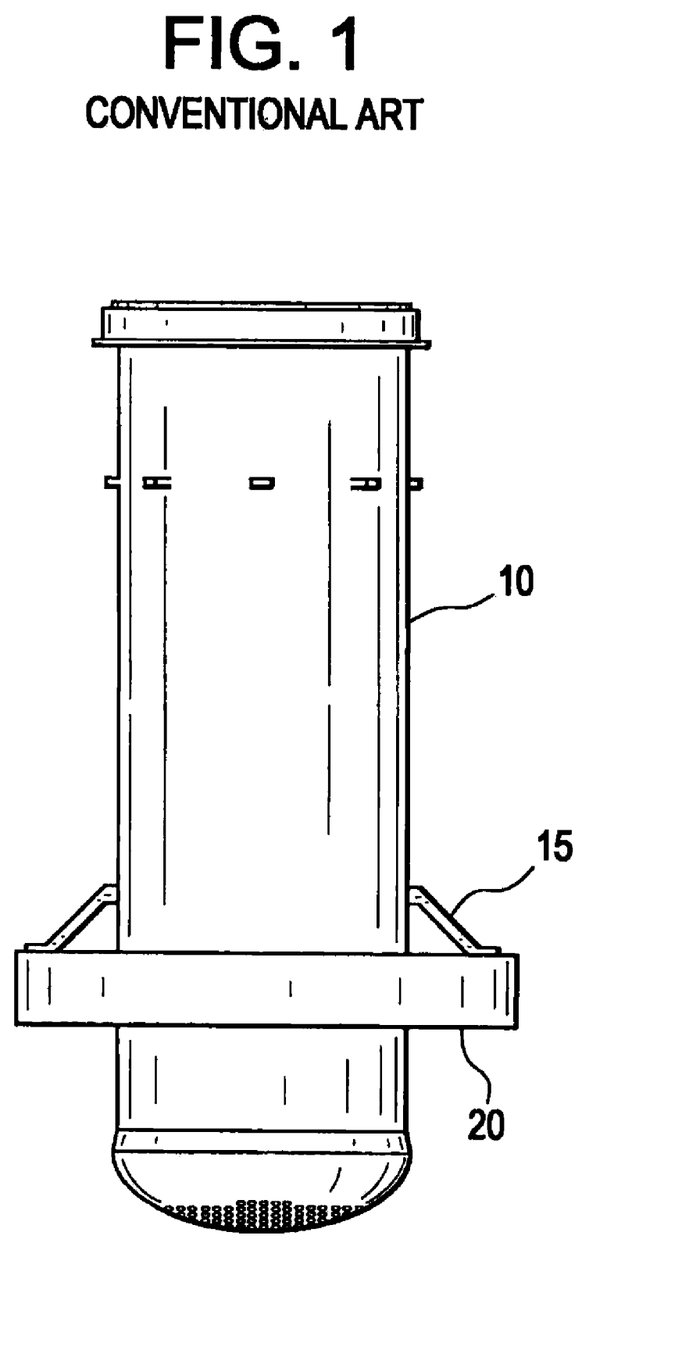
FIG. 1 is a view of a conventional pressure vessel utilizing a skirt type support.

One method of supporting a conventional pressure vessel includes supporting the pressure vessel with a skirt. FIG. 1, for example, illustrates a conventional pressure vessel 10 surrounded by a skirt 15 which is rigidly connected to both the pressure vessel 10 and a pedestal bracket 20. Pressure vessels may expand and contract due to pressure and thermal loadings within the pressure vessel. Such expansions and contractions may cause the skirt 15 to flex thus leaving the skirt 15 susceptible to fatigue.

SUMMARY

Example embodiments provide a sliding support unit and a system using the sliding support unit.

In accordance with an example embodiment, a system may include a pressure vessel with a plurality of support flanges, a pedestal bracket enclosing the pressure vessel, and a plurality of sliding support units between the plurality of support flanges and the pedestal bracket, the plurality of sliding support units configured to allow the pressure vessel to expand and contract radially.

A sliding support unit may include a fulcrum capture configured to attach to a support flange, a fulcrum support configured to engage to the fulcrum capture, and a baseplate block configured to support the fulcrum support.

BRIEF DESCRIPTION OF THE DRAWINGS

Example embodiments will be more clearly understood from the following detailed description taken in conjunction with the accompanying drawings.

DETAILED DESCRIPTION

Example embodiments will now be described more fully with reference to the accompanying drawings. Example embodiments may, however, be embodied in many different forms and should not be construed as being limited to the embodiments set forth herein; rather, example embodiments are provided so that this disclosure will be thorough and complete, and will fully convey the inventive concept to those skilled in the art. In the drawings, the thicknesses of layers and regions are exaggerated for clarity.

It will be understood that when a component, for example, a layer, a region, or a substrate is referred to as being "on", "connected to", or "coupled to" another component throughout the specification, it can be directly "on", "connected to", or "coupled to" the other component, or intervening layers that may be present. On the other hand, when a component is referred to as being "directly on", "directly connected to", or "directly coupled to" another component, it will be understood that no intervening layer is present. Like reference numerals denote like elements. As used in the present specification, the term "and/or" includes one of listed, corresponding items or combinations of at least one item.

In the present description, terms such as 'first', 'second', etc. are used to describe various members, components, regions, layers, and/or portions. However, it is obvious that the members, components, regions, layers, and/or portions should not be defined by these terms. The terms are used only for distinguishing one member, component, region, layer, or portion from another member, component, region, layer, or portion. Thus, a first member, component, region, layer, or portion which will be described may also refer to a second member, component, region, layer, or portion, without departing from the teaching of the present general inventive concept.

Relative terms, such as "under," "lower," "bottom," "on," "upper," and/or "top", may be used herein to describe one element's relationship to another element as illustrated in the figures. It will be understood that relative terms are intended to encompass different orientations of the device in addition to the orientation depicted in the figures. For example, if the device in the figures is turned over, elements described as being on the "upper" side of other elements would then be oriented on "lower" sides of the other elements. The exemplary term "upper", can therefore, encompass both an orientation of "lower" and "upper", depending of the particular orientation of the figure.

The terminology used herein is for the purpose of describing example embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 2:
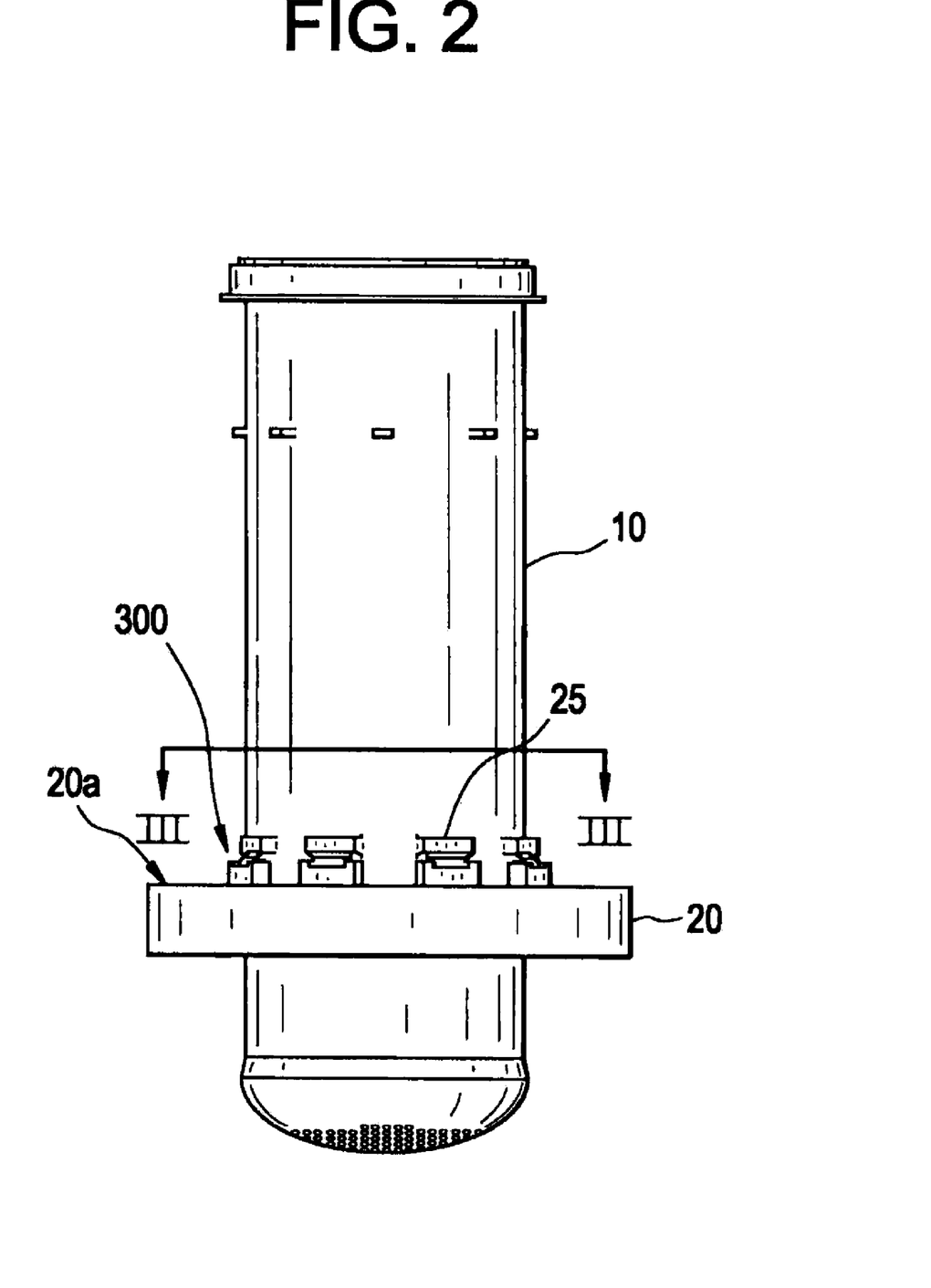
FIG. 2 is a view of a pressure vessel supported by sliding type support units according to an example embodiment.
Figure 3:
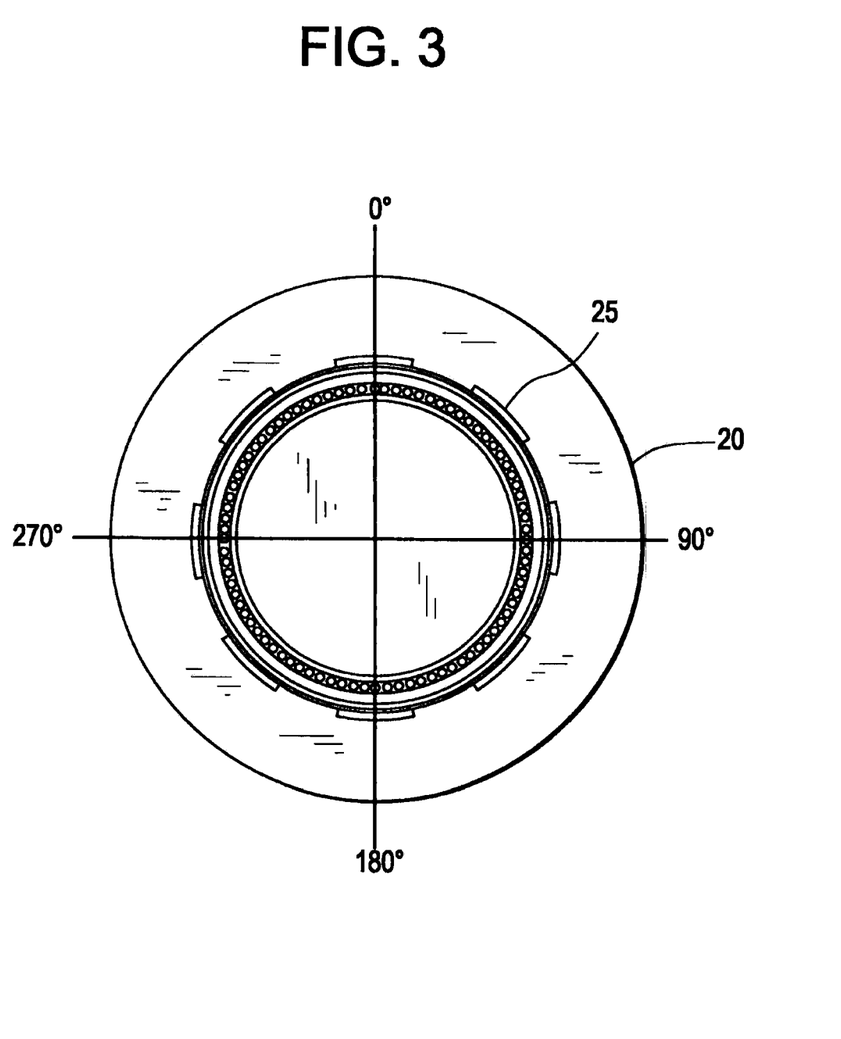
FIG. 3 is a top view of a pressure vessel illustrating eight (8) support flanges which may be used with the sliding support units according to an example embodiment.

FIGS. 2 and 3 illustrate a top view and a side view of a pressure vessel supported by sliding type support units according to an example embodiment. As shown, a pressure vessel 10 is enclosed by a pedestal bracket 20. The pressure vessel 10 may resemble a vertically oriented cylinder that is capped at each end. The pressure vessel 10 may be a reactor pressure vessel, however, example embodiments are not limited thereto. The pedestal bracket 20 may comprise a concrete ring surrounding the pressure vessel 10. The pedestal bracket 20 may include a steel plate (not shown) embedded in a top surface 20a of the pedestal bracket. As will be discussed later, the steel plate may function as an attachment point for a sliding support unit 300.

As shown in FIGS. 2 and 3, the pressure vessel 10 may include eight support flanges 25 that may be equally spaced around a perimeter of the pressure vessel 10. The flanges 25 may be formed integrally with the pressure vessel 10 during the vessel's fabrication or may welded to the pressure vessel 10 after fabrication. As discussed, each of the eight support flanges 25 may be equally spaced around a perimeter of the pressure vessel 10. For example, each of the support flanges may be spaced in approximately 45 degree increments with respect to an axis of the pressure vessel 10. Although FIGS. 2 and 3 illustrate a conventional pressure vessel 10 with eight support flanges 25, example embodiments are not limited thereto. For example, there may be more or less than eight support flanges.

Figure 4:
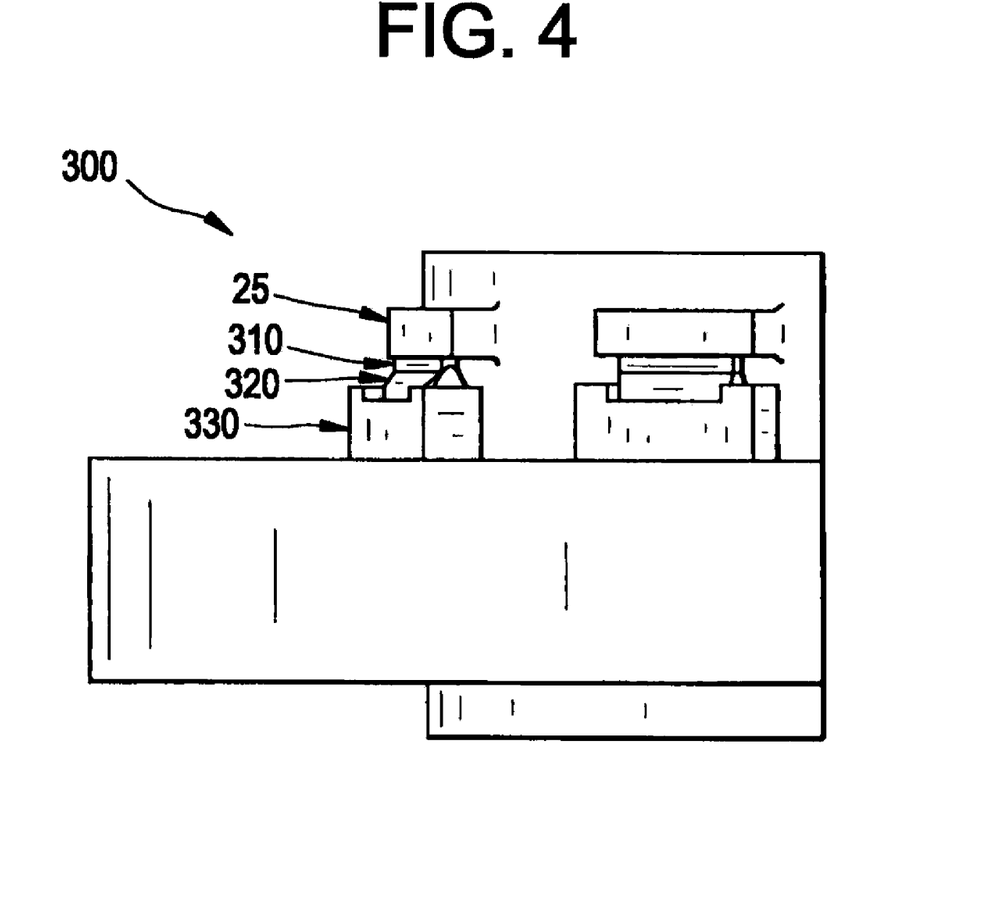
FIG. 4 is a close-up view of a sliding support unit according to an example embodiment.

Between each of the support flanges 25 and the pedestal bracket 20 are sliding support units 300. FIG. 4 illustrates each of the sliding support units 300 may include a fulcrum capture 310, a fulcrum support 320, and a baseplate block 330. Each of the fulcrum capture 310, the fulcrum support 320, and the baseplate block 330 may be made from a low alloy steel. Non-limiting examples of a low alloy steel that may be used to fabricate the fulcrum capture 310, the fulcrum support 320, and the baseplate block 330 include SA503 and SA508. Because each of the sliding support units 300 under each support flange 25 are identical, only one of the units will be discussed for the sake of brevity.

Figure 5A:
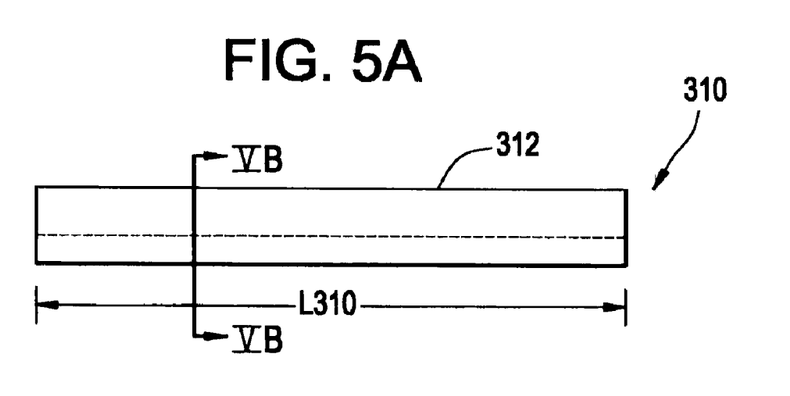
FIGS. 5A-5C are views of a fulcrum capture according to an example embodiment.
Figure 5B:
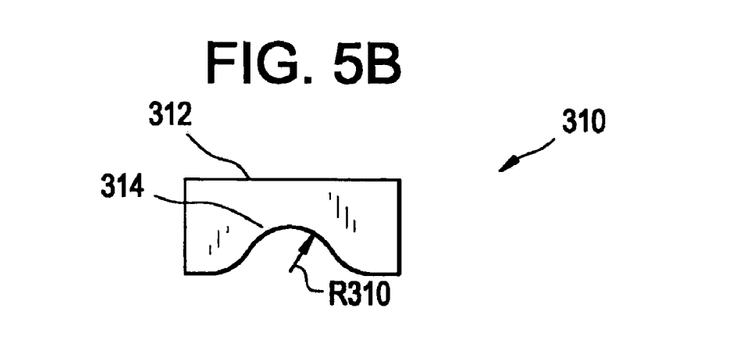
Figure 5C:
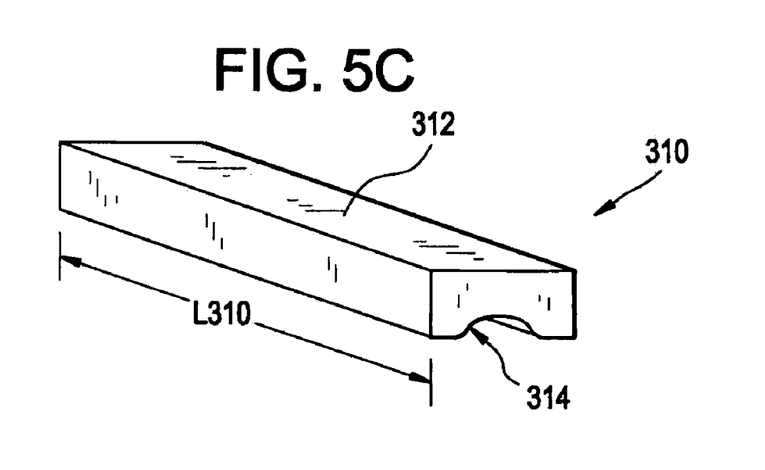

As shown in FIGS. 4, 5A, 5B, and 5C, the fulcrum capture 310 resembles a substantially long straight bar having a length L310. The fulcrum capture 310 may include a substantially flat top surface 312 and a groove 314 formed along a bottom surface of the fulcrum capture 310. As shown in FIG. 5B, the groove 314 may have a circular profile that may have a radius of R310. The top surface 312 of the fulcrum capture 310 may attach to a bottom surface of a support flange 25. For example, the fulcrum capture 312 may be welded to the support flange 25 or bolted to the support flange 25.

Figure 6A:
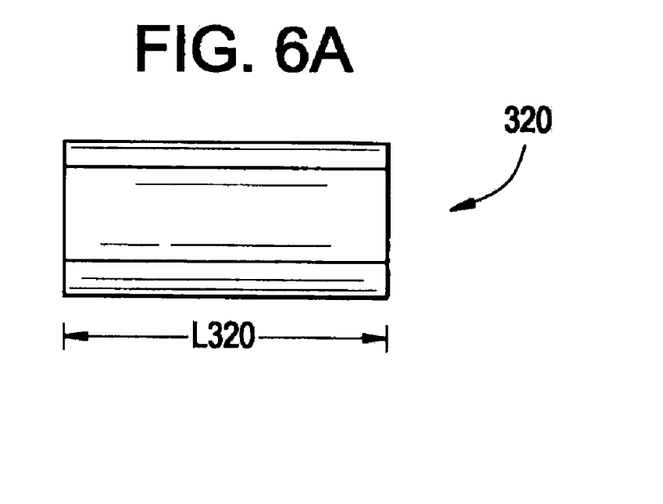
FIGS. 6A-6C are views of a fulcrum support according to an example embodiment.
Figure 6B:
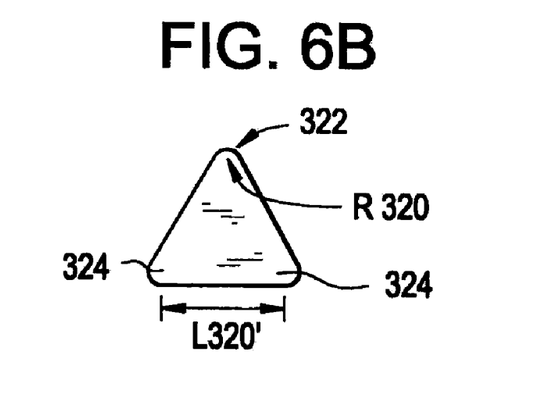
Figure 6C:
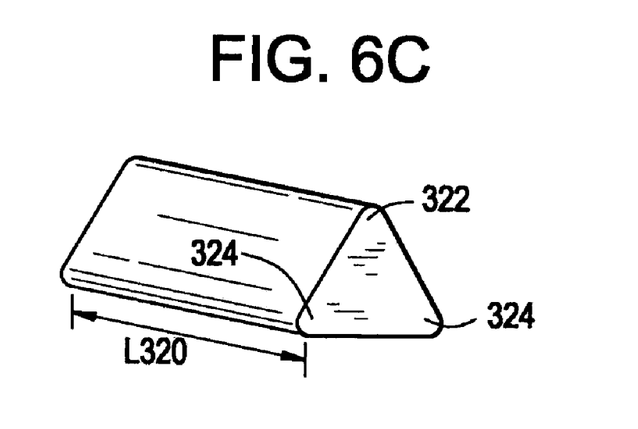

FIGS. 6A, 6B, and 6C illustrate a fulcrum support 320. The fulcrum support 320 resembles a bar having a length L320. The fulcrum support 320 may have a triangular cross-section with rounded corners 322 and 324 as shown in FIG. 6B. For example, the bottom corners 324 of the fulcrum support may be rounded and the flat portion of the bottom surface of the fulcrum support may have a length of L320'. Additionally, a top corner 322 of the fulcrum support may be rounded to have a radius of R320. In example embodiments, the radius R320 of the top corner 322 of the fulcrum support 320 should be substantially equal to the radius R310 of the groove 314 of the fulcrum capture 310. However, example embodiments are not limited thereto. For example, the radius R320 may be smaller than the radius R310.

Figure 7A:
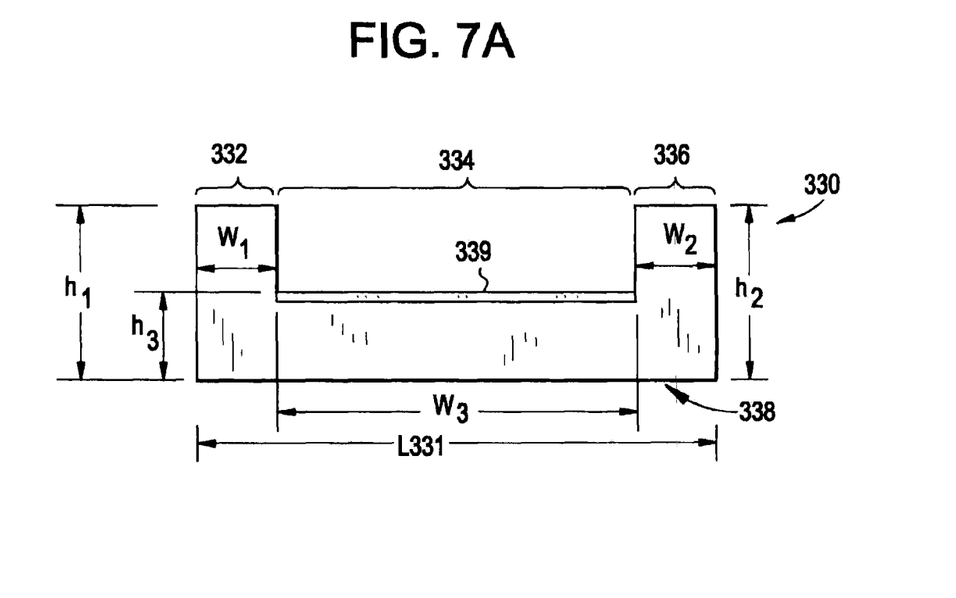
FIGS. 7A-7B are views of a base plate block according to an example embodiment.
Figure 7B:
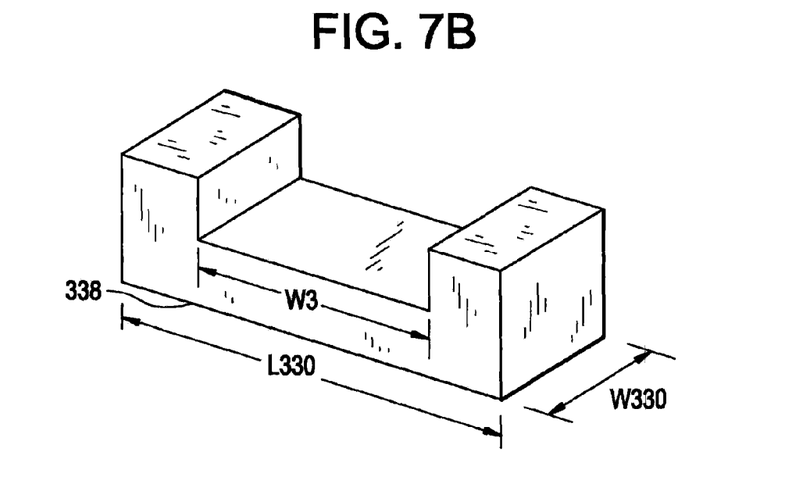

The base-plate block 330 may resemble a multi-tiered block structure. For example, as shown in FIGS. 7A and 7B, the base-plate block 330 may include a first end portion 332, a second end portion 336, and a middle portion 334. The first end portion 332, for example, may resemble a block having a height h1 extending in a direction that is substantially parallel to an axis of the pressure vessel 10, a width W1 extending in a direction substantially lateral to the pressure vessel 10, and a width W330 extending in a direction substantially towards the pressure vessel 10. The second end portion 336, for example, may also resemble a block having a height h2 extending in a direction that is substantially parallel to an axis of the pressure vessel 10, a width W2 extending in a direction substantially lateral to the pressure vessel 10, and a width W330 extending in a direction substantially towards the pressure vessel 10.

The middle portion 334 may connect the first end portion 332 to the second end portion 336 and may also resemble a block having a height h3 which is less than the heights h1 and h2, a width W3 extending in a direction substantially lateral to the pressure vessel 10, and a width W330 extending in a direction substantially towards the pressure vessel 10. The middle portion 334 may include a low-friction plate 39 upon which a bottom surface of the fulcrum support 320 may rest. The low-friction plate 39 may, for example, be a bronze plate impregnated with graphite or a ceramic plate. The low-friction plate 39 may also be a self-lubricating plate. As low-friction plate, as used herein, is a plate which has a coefficient of friction less than or equal to 0.15.

Figure 8A:
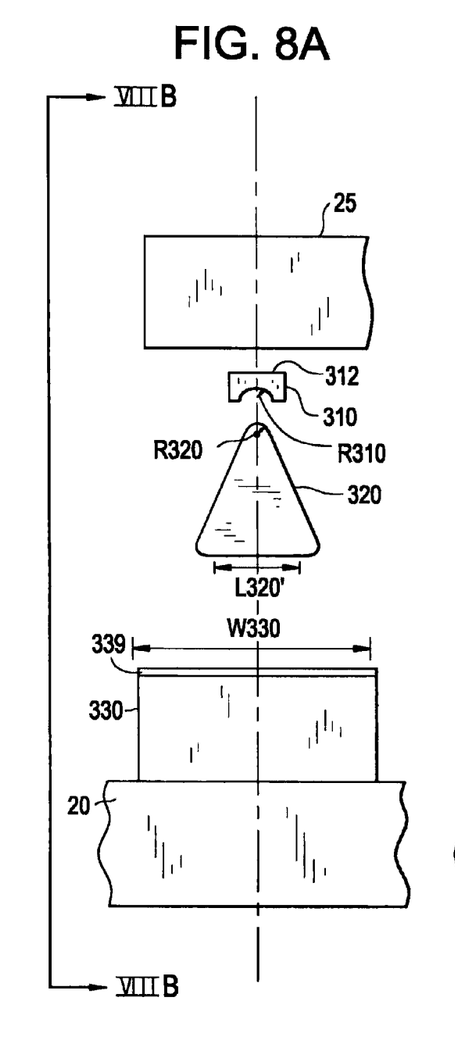
FIGS. 8A and 8B are exploded views of a sliding support unit according to an example embodiment.
Figure 8B:
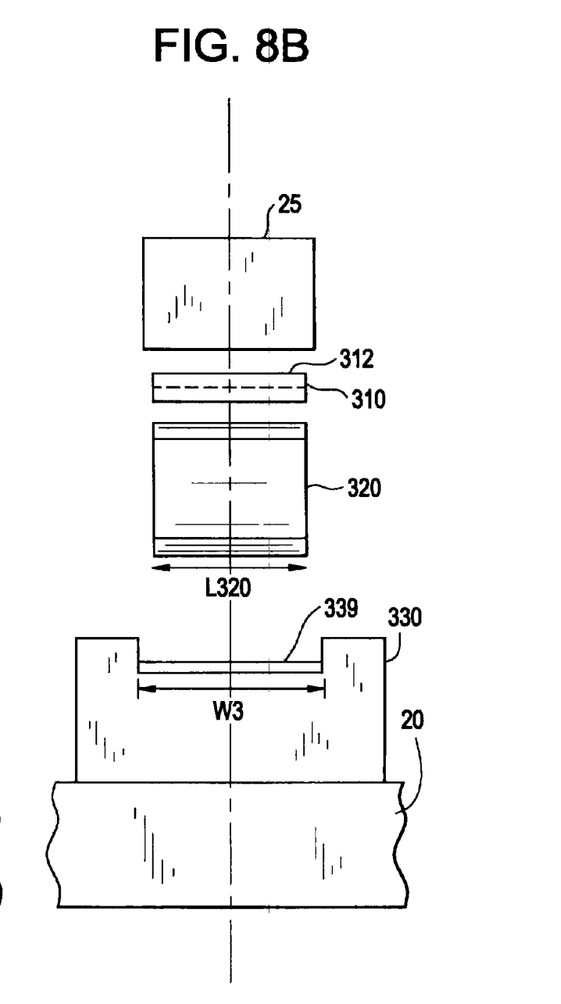

FIGS. 8A and 8B are exploded views showing the different elements of the sliding support unit 300. As shown in FIG. 8A, the top surface 312 of the fulcrum capture 310 may be attached to a bottom surface of a support flange 25. In accordance with example embodiments, the fulcrum capture 310 may be either welded and/or bolted to the support flange 25. The fulcrum capture 310 should be attached to the supporting flange 25 so that the length L310 of the fulcrum capture is lateral to the axis of the pressure vessel 10. For example, the fulcrum capture 310 should oriented so that the length L310 of the fulcrum capture 310 is parallel to a line that is tangent to a horizontal circle having a center coincident with the center of the pressure vessel.

The bottom portion of the fulcrum capture 310 may include a groove 314 having a radius R310 which may be substantially equal to the radius R320 of the fulcrum support 320. Accordingly, the top of the fulcrum support 320 may slidingly fit within the groove 314 of the fulcrum capture 310 when the unit is assembled. Accordingly, the connection between the fulcrum support 320 and the fulcrum capture 310 is not conducive to forming any significant moment therebetween.

The bottom surface of the fulcrum support 320 may contact the top surface of the middle portion 334 of the base plate block 330. In order to reduce friction loading between the bottom surface of the fulcrum support 320 and the middle portion 334, the middle portion may include a low-friction plate 339. For example, the middle portion may include a bronze plate impregnated with graphite. Accordingly, the middle portion 334 of the baseplate block 330 would offer minimal restraint in a radial direction with respect to the pressure vessel 10.

As shown in FIG. 8A, the cross-section of the fulcrum support 320 resembles a triangle with curved corners. The flat portion of the base of the cross-section of the fulcrum 320, as shown in FIG. 8A, has length L320' which is less than a length W330 of the baseplate block 330 extending towards the pressure vessel 10. Additionally, the axial length of the fulcrum support 320 has a length L320 which is substantially equal to, or slightly smaller than a length of the middle portion W3, as shown in FIG. 8B.

The bottom surface 338 of the baseplate block 330 may be attached to the pedestal bracket 20. As previously mentioned, the top of the pedestal bracket may include metal plates. The metal plates may be secured to the pedestal bracket 20 via anchor bolts or studs. Accordingly, the baseplate block 330 may be securely attached to the pedestal bracket 20 by welding the baseplate block 330 to the pedestal bracket plates. Although example embodiments are described as welding the baseplate block 330 to the pedestal bracket 20, example embodiments are not limited thereto. For example, the baseplate block 330 may alternatively be bolted to the pedestal bracket 20.

The deadweight of the pressure vessel 10 may be transferred to the pedestal bracket 20 through the sliding support units 300. For example, the deadweight of the pressure vessel 10 may be transferred from the pressure vessel 10 to the sliding support units 300 via the support flanges 25, from the support flanges 25 to a fulcrum captures 310, from the fulcrum captures 310 to the fulcrum supports 320, from the fulcrum supports 320 to the baseplate block 330, and from the baseplate block 330 to the pedestal bracket 20.

In the event the pressure vessel 10 expands radially, the expansion of the pressure vessel 10 would cause the support flanges 25 and the fulcrum captures 310 to move outward from the center of the pressure vessel 10. The movement of the fulcrum capture 310 would cause the fulcrum support 320 to slide on the middle portions 334 of the baseplate block 330 in a direction which is radial to an axis of the pressure vessel 10. However, because the middle portion 334 of the baseplate blocks 330 may be provided with a low-friction plate 339, the fulcrum support 320 would merely slide along the middle portion 334 of the baseplate block 330 without offering any relatively significant resistance to the movement of the pressure vessel 10. Accordingly, the sliding support unit 300 may allow the pressure vessel 10 to expand freely without generating any significant internal stresses due to the expansion of the pressure vessel 10. For somewhat similar reasons, the sliding support unit 300 may allow the pressure vessel 10 to contract without generating significant internal stresses due to the contraction of the pressure vessel 10.

Although the sliding support units 300 may allow the pressure vessel 10 to expand and contract radially, the support units 300 do not allow the pressure vessel 10 to rotate axially. The axial rotation of the pressure vessel 10 is prevented via the interaction of the fulcrum support 320 and the baseplate block 330. As explained above, and shown in FIG. 8B, the fulcrum capture 310 may reside in the middle portion 334 of the baseplate block 330. The length W3 of the middle portion 334 may be slightly larger than the length L320 of the fulcrum support 320 so that the fulcrum support 320 may fit into the middle portion 334 of the baseplate block 330. Accordingly, if a torsional moment were applied to the pressure vessel 10, the rotation of the pressure vessel 10 would rotate the support flange 25, the fulcrum capture 310, and the fulcrum support 320 until the fulcrum support 320 rotates into one of the first and second portions 332 and 336 of the base plate block 330. However, because the baseplate block 330 is attached to the pedestal bracket 20, the motion of the fulcrum support 320 is stopped thus preventing further rotation of the pressure vessel 10. Accordingly, the sliding support units 300 offer significant resistance to a torsional rotation of the pressure vessel 10.

As disclosed, the sliding support units 300 offer a pressure vessel vertical and torsional restraint while, at the same time, offer the pressure vessel the ability to expand and/or contract relatively freely. However, the supporting units 300, as described offer no resistance which may keep the pressure vessel 10 from moving upwards or from overturning.

Figure 9:
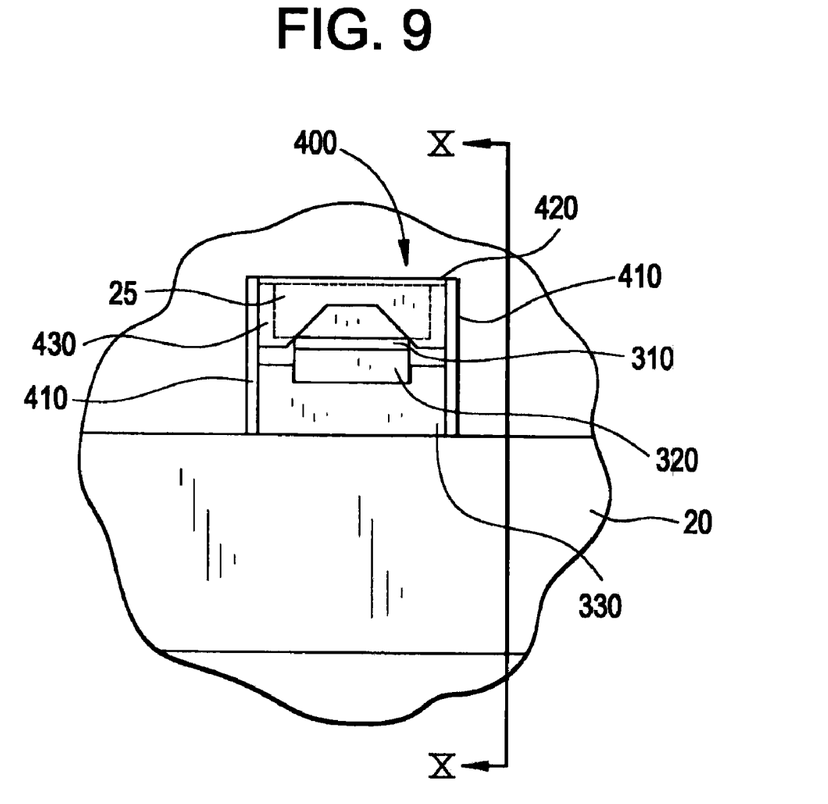
FIG. 9 is a view of a vertical restraint according to an example embodiment.
Figure 10:
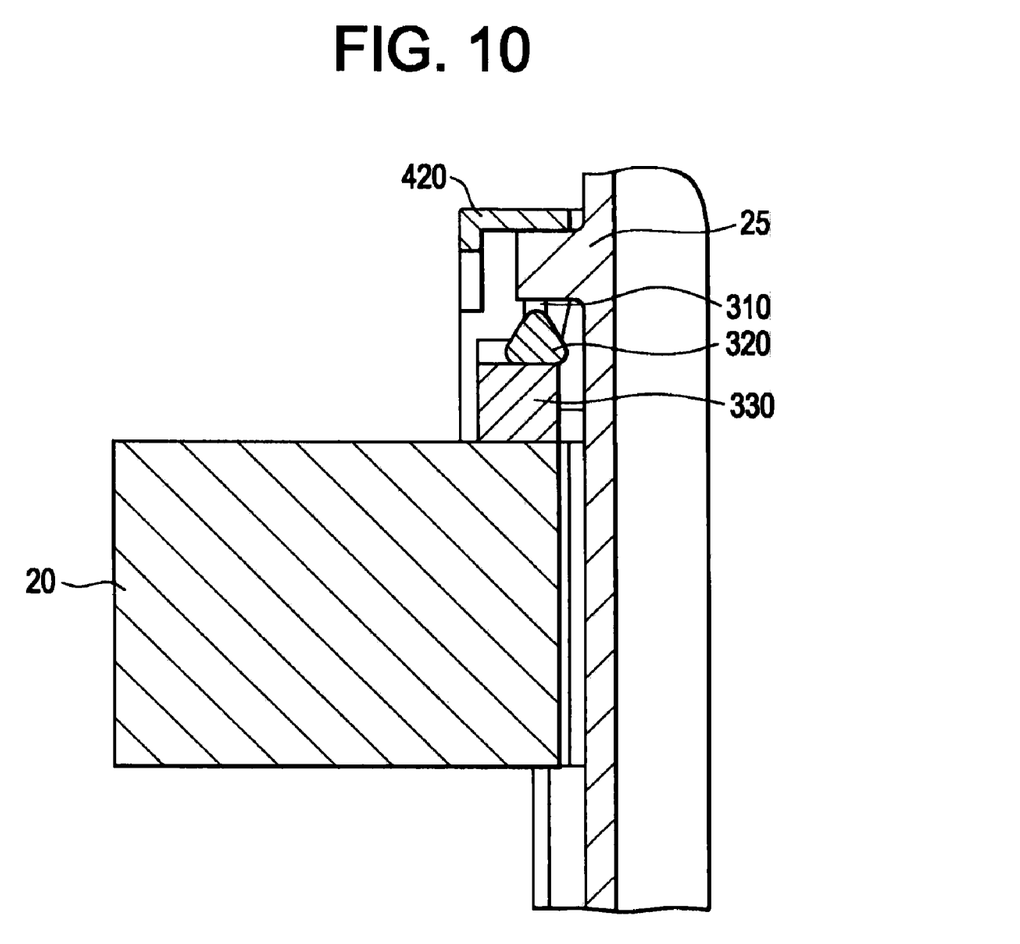
FIG. 10 is a side view of a vertical restraint according to an example embodiment.

To prevent the pressure vessel 10 from overturning or moving upward, the sliding support units 300 may be modified to include an additional vertical restraint. FIGS. 9 and 10 illustrate a modified sliding support unit 300. As shown in FIG. 9, the modified sliding support unit 300 may include a vertical restraint 400, in addition to including the fulcrum capture 310, the fulcrum support 320, and the baseplate block 330.

The vertical restraint 400 may include two vertical side walls 410 positioned on either side of the baseplate block 330, a vertical tie plate 430 between the two vertical side walls 410, and a top bridge plate 420. The bottoms of the vertical side walls 410 may be connected the top surface of the pedestal bracket 20. For example, the bottoms of the vertical side walls 410 may be welded or bolted to the pedestal bracket 20. Additionally, the side walls 410 may be welded or bolted to the baseplate block 330, however, example embodiments are not limited thereto. For example, the vertical side walls 410 may not be welded or bolted to the baseplate block 330.

The vertical side walls 410 may be made from a plate material. For example, the vertical side walls 410 may be made from plates of low alloy steel, for example, SA508. However, example embodiments are not limited thereto. For example, the vertical side walls 410 may be constructed from tube steel or various other shaped steel members.

The vertical tie plate 430 may be provided to connect the vertical side walls 410. For example, the tie plate 430 may be welded or bolted to the vertical side walls 410. As shown in FIG. 8, the tie plate 430 may be formed to have a trapezoidal opening allowing inspection and/or maintenance of the sliding support units 300.

The bridge plate 420 may be provided at the top of the vertical restraint 400. The bridge plate 420 may be a horizontal plate which is positioned over the top surface of the support flange 25 and may be welded or bolted to the side walls 410. Therefore, as modified, the sliding support unit 300 may be configured to prevent the pressure vessel 10 from moving upwards and/or overturning. Although vertical restraint 400 is described as including a bridge plate 420, example embodiments are not limited thereto. For example, rather than using a plate, tube steel or a W-shaped member may be provided instead of the bridge plate 420 in order to stiffen and strengthen the vertical restraint.

The sliding support units 300 may be provided symmetrically around a circumference of a pressure vessel as shown in FIGS. 2 and 3. Each of the support units 300 may include a fulcrum capture 310, a fulcrum support 320, and a baseplate block 330, as shown in at least FIG. 4. The fulcrum support 320 may rest directly on a top of the baseplate block 330 that may be attached to a pedestal bracket 20. The geometry of the fulcrum capture 310 and the weight of the pressure vessel 10 provide vertical restraint to the fulcrum support 320 and ensure that the fulcrum support 320 is coupled to the pressure vessel 10. Each of the fulcrum supports 320 is positioned between a first portion 332 and a second portion 336 of the baseplate block 330 to prevent axial rotation of the pressure vessel 10. The fulcrum support 320 may transfer a vertical (downward) load from the pressure vessel 10 to the baseplate block 330.

The sliding support units 300 may be modified to include an extra vertical restraint 400. The vertical restraint may include two vertical side walls 410, a tie plate 430, and a bridge plate 420. The two vertical side walls 410 may be disposed to the sides of the baseplate block 330 and may be attached to the pedestal bracket 20 by bolting or welding. Additionally, the two vertical side walls 410 may be attached to the baseplate block 330. A tie plate 430 may be connected to the two vertical side walls 410 and may have a trapezoidal section removed so that the sliding support units 300 may be inspected. The bridge plate 420 may be connected to the vertical side walls 410 and may be arranged over a top of a support flange 20. Accordingly, the vertical restraint 400 may prevent the pressure vessel 10 from moving upwards or overturning.

While example embodiments have been particularly shown and described with reference to example embodiments thereof, it will be understood by those of ordinary skill in the art that various changes in form and details may be made therein without departing from the spirit and scope of the following claims.

What is claimed is:

1. A system, comprising:
a pressure vessel with a plurality of support flanges;
a pedestal bracket enclosing the pressure vessel and configured to support the pressure vessel; and
a sliding support unit between each of the support flanges and the pedestal bracket,
each of the sliding support units configured to allow the pressure vessel to expand and contract in a radial direction,
each of the sliding support units including,
a fulcrum capture attached to the respective support flange,
a fulcrum support, attached to the fulcrum capture, having a longitudinal length that is about perpendicular to the radial direction, the longitudinal length of the fulcrum support having a triangular cross-sectional shape with a bottom surface,
a baseplate block having a longitudinal length about parallel to the longitudinal length of the fulcrum support, the baseplate block having a first end portion and a second end portion on either longitudinal end of the baseplate block, a middle portion, between the first and second end portions, having a height which is less than a height of the first and second end portions,
the baseplate block attached to the pedestal bracket and configured to support the fulcrum support, the bottom surface of the fulcrum support being slideable, in the radial direction, along an upper surface of the middle portion of the baseplate block.

2. The system of claim 1, wherein the fulcrum capture includes a bottom surface with a groove.

3. The system of claim 2, wherein the groove has a first radius.

4. The system of claim 3, wherein the fulcrum support has a rounded upper peak with a radius that is substantially the same as the first radius.

5. The system of claim 1, wherein the baseplate block has a longitudinal length that is about perpendicular to the radial direction, with a first end portion and a second end portion on either end of the longitudinal length of the baseplate block, the first end portion having a first height, the second end portion having a second height, and the middle portion having a third height.

6. The system of claim 5, wherein the upper surface of the middle portion includes a low friction bronze plate embedded with graphite.

7. The system of claim 5, wherein the third height is less than the first and second heights.

8. The system of claim 5, wherein the middle portion has a length that is longer than the longitudinal length of the fulcrum support.

9. The system of claim 1 further comprising: a vertical restraint.

10. The system of claim 9, wherein the vertical restraint includes a first side wall adjacent to a first end portion of the baseplate block, a second side wall adjacent to a second end portion of the baseplate block, a tie plate connecting the first side wall to the second side wall, and a bridge plate attached to the first side wall and the second side wall.

11. The system of claim 9, wherein a bridge plate is above a top surface of the support flange.

12. The system of claim 1, wherein the pressure vessel is a nuclear reactor pressure vessel.

13. A sliding support unit, comprising:
a fulcrum capture configured to attach to a support flange of a pressure vessel;
a fulcrum support attached to the fulcrum capture, the fulcrum support having a longitudinal length with a triangular cross-sectional shape and a bottom surface; and
a baseplate block having a longitudinal length about parallel to the longitudinal length of the fulcrum support, the baseplate block having a first end portion and a second end portion on either longitudinal end of the baseplate block, a middle portion, between the first and second end portions, having a height which is less than a height of the first and second end portions,
the baseplate block configured to support the fulcrum support, the bottom surface of the fulcrum support being slideable along an upper surface of the middle portion of the baseplate block, the fulcrum support being slideable in a direction that is about perpendicular to the longitudinal length of the fulcrum support.

14. The sliding support unit according to claim 13, wherein the fulcrum capture includes a bottom surface with a groove and the fulcrum support has a rounded upper peak configured to engage the groove.

15. The sliding support unit according to claim 14, wherein the middle portion has a length that is longer than the longitudinal length of the fulcrum support.

16. The sliding support unit according to claim 15, wherein the upper surface of the middle portion of the baseplate block includes a low friction bronze plate embedded with graphite.

* * * * *